United States Patent Office 3,681,081
Patented Aug. 1, 1972

3,681,081
SILVER HALIDE EMULSIONS CONTAINING MEROCYANINE AND HOLOPOLAR CYANINE DYES
Philip W. Jenkins and Leslie G. S. Brooker, Rochester, N.Y., assignors to Eastman Kodak Company, Rochester, N.Y.
No Drawing. Filed Sept. 16, 1970, Ser. No. 72,834
Int. Cl. G03c 1/10, 1/22
U.S. Cl. 96—127                                     11 Claims

ABSTRACT OF THE DISCLOSURE

Novel merocyanine and holopolar cyanine dyes containing a cyclopentane-1,3-dione nucleus, a 2,3,3a,4,7,7a-hexahydro-4,7-methanoindene-1,3-dione nucleus, a 9,10,11,12,14,15 - hexahydro-13H-9,10-endo-cyclopentanthracene-13,15-dione nucleus or a 2,3,3a,4,7,7a-hexahydro-4,7-epoxyindene-1,3-dione, for example, attached to the polymethine chain are useful sensitizers for photographic silver halide emulsions. Depending upon their particular structure they are prepared from cyclopentane-1,3-dione or ketomethylene compounds derived from cyclopentene-1,3-dione.

This invention relates to novel and useful photographic materials, and more particularly to a new class of merocyanine and holopolar cyanine dyes prepared from cyclopentane-1,3-dione or ketomethylene compounds derived from cyclopentene-1,3-dione, to novel photographic silver halide emulsions containing these dyes as sensitizers, to photographic elements containing the novel silver halide emulsions, and to the preparation of such dyes and photographic materials.

Cyanine dyes are known to extend the sensitivity of photographic silver halide emulsions. However, this class includes whole groups of dye compounds which have no sensitizing ability or which even have a desensitizing effect. The number of sensitizers of this class which can be used in commercial practice is further limited by the strict requirements that a useful sensitizer must meet, when incorporated into silver halide emulsion layers. For example, they must not only selectively extend the sensitivity range, but must also be soluble and compatible with the emulsions, cause very little, if any, fogging, and not reduce the keeping stability of the emulsions and photographic elements pending their actual use. These and other known requirements for useful sensitizers are particularly important in the case of color photographic materials and processes. It will be apparent, therefore, that all these requirements can be more or less completely met by only relatively few groups of dyes.

We have now found that merocyanine and holopolar cyanine dyes containing a cyclopentane-1,3-dione nucleus a 2,3,3a,4,7,7a - hexahydro-4,7-methanoindene-1,3-dione nucleus, a 9,10,11,12,14,15-hexahydro-13H-9,10-endo-cyclopentanthracene-13,15-dione nucleus or a 2,3,3a,4,7,7a-hexahydro-4,7-epoxyindene-1,3-dione nucleus, for example, attached to the polymethine chain and more particularly the holopolar cyanine dyes of the invention, substantially meet all of the above mentioned requirements, and thus provide a new class of especially useful sensitizers for both black-and-white and color photographic materials and processes. The dyes of the invention are also useful as light-screening substances for photographic filter layers.

It is, accordingly, an object of the invention to provide a new class of merocyanine and holopolar cyanine dyes that are useful sensitizers for photographic silver halide emulsions. Another object is to provide novel photographic silver halide emulsions containing at least one of the new merocyanine or holopolar cyanine dyes of the invention, and novel photographic elements prepared with such emulsions. Another objective is to provide light-screening layers for photographic elements which contain at least one of the dye compounds of the invention. Other objects will become apparent from a consideration of the general description and the appended claims.

The new class of merocyanine and holopolar cyanine dyes of the invention are represented by the following general formulas:

(I)
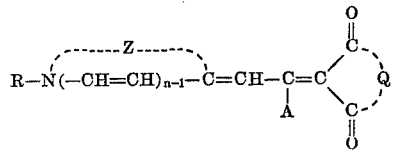

and (II)
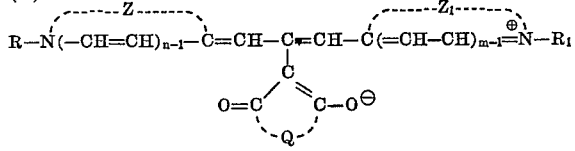

wherein m and n each represents a positive integer of from 1 to 2, A represents a hydrogen atom, a lower alkyl group having 1 to 4 carbon atoms, e.g. methyl, ethyl, propyl, isopropyl or butyl, or an aryl nucleus such as phenyl, tolyl, methoxyphenyl, ethoxyphenyl, chlorophenyl, sulfophenyl, carboxyphenyl, etc., R and $R_1$ each represents an alkyl group, preferably a lower alkyl containing from 1 to 4 carbon atoms, e.g. methyl, ethyl, propyl, isopropyl, butyl, pentyl, hexyl, heptyl, octyl, nonyl, decyl, undecyl, dodecyl, etc., a hydroxyalkyl group, e.g. β-hydroxyethyl, β-hydroxypropyl, γ-hydroxypropyl, ω-hydroybutyl, etc., an alkoxyalkyl group, e.g., β-methoxyethyl, β-ethoxyethyl, β-butoxyethyl, γ-methoxypropyl, γ-ethoxypropyl, ω-methoxybutyl, ω-ethoxybutyl, ω-butoxybutyl, etc., a carboxyalkyl group, e.g., carboxymethyl, β-carboxyethyl, γ-carboxypropyl, ω-carboxybutyl, etc., a sulfoalkyl group, e.g., β-sulfoethyl, γ-sulfopropyl, ω-sulfobutyl, etc., a sulfatoalkyl group, e.g., β-sulfatoethyl, γ-sulfatopropyl, γ-sulfatobutyl, ω-sulfatobutyl, etc., an alkanoyloxyalkyl group, e.g., β-acetoxyethyl, β-propionyloxyethyl, γ-acetoxypropyl, ω-acetoxybutyl, ω-butyryloxybutyl, etc., an alkoxycarbonylalkyl group, e.g., β-methoxycarbonylethyl, β-ethoxycarbonylethyl, γ-ethoxycarbonylpropyl, ω-ethoxycarbonylbutyl, ω-butoxycarbonylbutyl, etc., an alkenyl group, e.g., allyl, 1-propenyl, 2-butenyl, 2-pentenyl, etc., an aralkyl group, e.g., benzyl, phenethyl, etc., or a monocyclic aryl nucleus containing 6 nuclear carbon atoms, e.g., phenyl, tolyl, xylyl, alkoxyphenyl, e.g., methoxyphenyl, ethoxyphenyl, etc., chlorophenyl, sulfophenyl, carboxyphenyl, etc.; Q represents the non-metallic atoms necessary to complete a carbocyclic nucleus selected from the group consisting of cyclopentane-1,3-dione and the products of the Diels-Alder reaction of the dienophile cyclopentene-1,3-dione with a diene, such as cyclopentadiene, anthracene, furan and the like; and Z and $Z_1$ each represents the non-metallic atoms necessary to complete a heterocyclic nucleus containing from 5 to 6 atoms in the heterocyclic ring such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl) - thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethyloxybenzothiazole, 5,6-dioxymethylenebenzothiazole, 5-hydroxybenzothiazole, 6-hydroxybenzothiazole, etc.) a naphthothiazole nucleus (e.g., α-naphthothiazole, β-naphthothiazole, 5-methoxy - β,β - naphthothiazole, 5-ethoxy-β-naphthothiazole, 8-methoxy-α-naphthothiazole, 7-methoxy-α-naphthothiazole, etc.), a thionaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.) a naphthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), and the like. The symmetrical holopolar cyanine dyes defined by Formula II of the invention, wherein Z and $Z_1$ each represents the same non-metallic atoms necessary to complete the same heterocyclic nucleus, are particularly efficacious sensitizers for photographic silver halide emulsions and are the preferred species of the invention.

Examples of the carbocyclic nuclei obtained by the Diels-Alder reaction referred to in the preceding paragraph are the 2,3,3a,4,7,7a-hexahydro-4,7-methanoindene-1,3-dione nucleus, the 9,10,11,12,14,15-hexahydro-13H-9,10-endo-cyclopentanthracene-13,15-dione nucleus and the 2,3,3a,4,7,7a - hexahydro-4,7-epoxyindene-1,3-dione nucleus, and the like.

The new merocyanine dyes of the invention as defined by above Formula I may be prepared in a number of ways. One method, for example, comprises reacting approximately equimolar proportions of (1) a compound having the general formula:

(III)

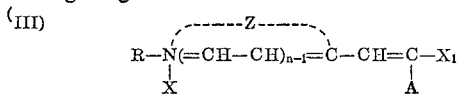

wherein $n$, A, R and Z are as previously defined, X represents an acid anion, e.g., chloride, bromide, iodide, thiocyanate, sulfamate, perchlorate, benzenesulfonate, p-toluenesulfonate methyl sulfate, ethyl sulfate, etc., and $X_1$ represents a halogen atom, e.g., chlorine, bromine, etc., an alkylthio group such as methylthio ($CH_3S-$) or ethylthio ($C_2H_5S-$) or an acetanilido group in the instance where A is a hydrogen atom with (2) a ketomethylene compound having the general formula:

(IV)

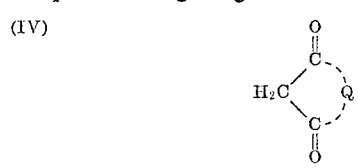

wherein Q is as previously defined, in an inert solvent medium such as N,N-dimethylacetamide, at normal room temperatures, in the presence of a basic condensing agent such as a trialkylamine, e.g., triethylamine, tri-n-propylamine, etc., N-methylpiperidine, N-ethylpiperidine, N,N-dimethylaniline, etc., until the reaction is substantially complete. The dye products are then separated from the reaction mixtures by chilling and filtering, and purified by one or more recrystallizations from suitable solvents such as hot N,N-dimethylacetamide, m-cresol at about 140 degrees C., mixtures of m-cresol and methanol, and the like.

Another method for preparing the new merocyanine dyes of the invention as defined by above Formula I comprises condensing, in the presence of a basic condensing agent such as mentioned previously, in an inert solvent medium such as ethanol, pyridine, etc., at elevated temperatures, (1) a compound having a reactive methyl group of the general formula:

(V)

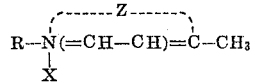

wherein R, X and Z are as previously defined, (2) an ortho ester of a monocarboxylic acid such as ethyl orthoformate and (3) a compound defined by Formula IV above. This method is especially useful for the preparation of the new merocyanine dyes of the invention containing the oxazole, benzoxazole and naphthoxazole nuclei.

The intermediate quaternary salt compounds defined by Formula III and V above are well known in the art, while the intermediate ketomethylene compounds defined by Formula IV above can be prepared as described by DePuy and Zarveski, J. Amer. Chem. Soc., 81, 4920-4 (1959).

The new holopolar cyanine dyes of the invention as defined by Formula II above are prepared with convenience by condensing approximately equimolar proportions of (1) a merocyanine dye of Formula I above with (2) a quaternary salt compound of the general formula:

(VI)

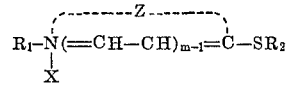

wherein $m$, $R_1$, X and $Z_1$ are as previously defined, and $R_2$ represents a lower alkyl group containing from 1 to 4 carbon atoms, e.g., methyl, ethyl, propyl, isopropyl, butyl, etc., in the inert solvent such as N,N-dimethylacetamide, m-cresol, and the like, at about 120 to 150 degrees C., in the presence of a basic condensing agent such as mentioned in the preceding description. The crude dye products are then separated from the reaction mixtures by chilling and filtration, and purified by one or more recrystallizations from suitable solvents such as pyridine, methanol, m-cresol, etc., and mixture of such solvents.

The following examples further illustrate the invention.

EXAMPLE 1

2-[(3-ethyl-2-benzothiazolinylidene)-1-methylethylidene]-1,3-cyclopentanedione

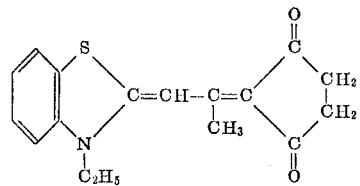

Cyclopentane-1,3-dione (1.50 g., 1 mol.) was dissolved in N,N-dimethylacetamide (20 ml.) and 2-(2-chloropropenyl)-3-ethylbenzothiazolium chloride (4.10 g., 1 mol.) was added to the solution. Triethylamine (1.50 g., 0.5 mol.) was added to the resulting slurry. The mixture was stirred for two minutes, diluted with methanol (25 ml.), and stirred for an additional two minutes. The crude product was collected by filtration, washed with methanol, and dried. A second crop of crude product was obtained by adding 2-(2-chloropropenyl)-3-ethylbenzothiazolium chloride (2.75 g., 0.67 mol.) and triethylamine (3.50 g., 1.17 mol.) to the combined filtrate and washed. After chilling the mixture overnight and the second crop was isolated by filtration, slurried with methanol, refiltered, and dried. The two crops of crude product were combined (3.30 g. 74%) and recrystallized by dissolving in boiling N,N-dimethylacetamide (150 ml.) and reprecipitating by the addition of methanol (600 ml.). After chilling the mixture, the crude dye was isolated by filtration, washed with methanol, and dried. (Yield: 2.95 g., 66%). After recrystallization of a portion of this material (0.75 g.) from N,N-dimethylacetamide and methanol, the yield of pure dye was 0.35 g. (36% corrected), M.P. 295.5–296.5 degrees C. dec.

*Analysis.*—Calcd. for $C_{17}H_{17}NO_2S$ (percent): C, 68.2; H, 5.7. Found (percent): C, 68.2; H, 5.6.

By the use of an equivalent amount of 3-ethyl-2-(2-methylthiostyryl)benzothiazolium p-toluenesulfonate 3-ethyl-2-(2-methylthio - 2-p - tolylvinyl)benzothiazolium p-toluenesulfonate, 3-ethyl-2 - (2-methylthio-1-butenyl)benzothiazolium p-toluenesulfonate or 2-(2-acetanilidovinyl)-3-ethylbenzothiazolium iodide, respectively, in place of 2-(2-chloropropenyl)-3-ethylbenzothiazolium chloride in Example 1, 2-[(3-benzothiazolinylidene)-1-phenylethylidene] - 1,3-cyclopentanedione, 2-[(3-ethyl-2-benzothiazolinylidene) - 1 - p-tolylethylidene]-1,3-cyclo pentanedione, 2-[(3-ethyl-2 - benzothiazolinylidene)-1-ethylethylidene]-1,3-cyclopentanedione and 2-[(3-ethyl-2-benzothiazolinylidene)ethylidene] - 1,3 - cyclopentane dione, respectively, are obtained.

EXAMPLE 2

2-[(1-ethylnaphtho[1,2-d]thiazolin - 2-ylidene)-1-methylethylidene]-2,3,3a,4,7,7a - hexahydro - 4,7-methanindene-1,3-dione

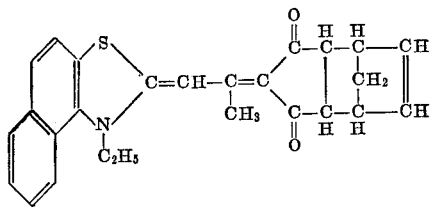

2,3,3a,4,7,7a-hexahydro-4,7-methanoindene - 1,3 - dione (3.35 g., 1 mol.) was mixed with N,N-dimethylacetamide (40 ml.). 2 - (2 - chloropropenyl) - 1 - ethylnaphtho[1,2-d]thiazolium chloride (6.50 g., 1 mol.) was added. To this stirred mixture, a solution of triethylamine (5.00 g., 1 mol.+25%) in N,N-dimethyl acetamide (10 ml.) was added in one portion, and the mixture was stirred for five minutes. The crude product was isolated by filtration, washed with methanol, and dried. One recrystallization, carried out by dissolving the crude product in m-cresol at 140 degrees C. and reprecipitating by the addition of methanol gave 5.75 g. (59%) of crude dye. After one recrystallization of a portion of this crude dye from m-cresol and methanol, the yield of pure dye was 0.41 g. (28% corrected yield), M.P. 256.5–258.5 degrees C. dec.

*Analysis.*—Calcd. for $C_{26}H_{23}NO_2S$ (percent): C, 75.5; H, 5.6. Found (percent): C, 75.5; H, 5.8.

By the use of an equivalent amount of 1-ethyl-2-(2-methylthiostyryl)naphtho[1,2-d]thiazolium p-toluenesulfonate, 1-ethyl-2-(2-methylthio-2-p-tolylvinyl)naphtho[1,2-d] thiazolium p-toluenesulfonate, 1-ethyl-2-(2-methylthio-1-butenyl)naphtho[1,2-d] thiazolium p-toluenesulfonate or 2-(2-anilinovinyl)-1-ethylnaphtho[1,2-d]thiazolium p-toluenesulfonate, respectively in place of 2-(2-chloropropenyl)-1-ethylnaphtho[1,2-d]thiazolium chloride in Example 2, 2-[(1-ethylnaphtho)[1,2-d]thiazolin-2-ylidene)-1-phenylethylidene]-2,3,3a,4,7,7a-hexahydro-4,7-methanoindene-1,3-dione;

2-[(1-ethylnaphtho)[1,2-d]thiazolin-2-ylidene)-1-p-tolylethylidene]-2,3,3a,4,7,7a-hexahydro-4,7-methanoindene-1,3-dione;

2-[(1-ethylnaphtho)[1,2-d]thiazolin-2-ylidene)-1-butenylidene]-2,3,3a,4,7,7a-hexahydro-4,7-methanoindene-1,3-dione and 2-[(1-ethylnaphtho)[1,2-d]thiazolin-2-ylidene)ethylidene]-2,3,3a,4,7,7a,-hexahydro-4,7-methanoindene-1,3-dione are obtained.

EXAMPLE 3

14 - [(1 - ethylnaphtho[1,2 - d]thiazolin-2-ylidene)-1-methylethylidene]-9,10,11,12,14,15 - hexahydro - 13H-9,10-endo-cyclopentanthracene-13,15-dione

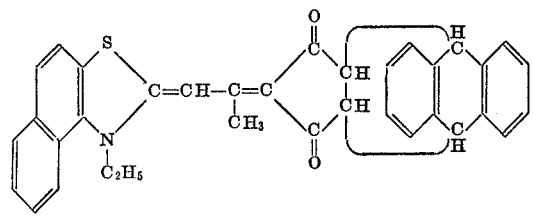

9,10,11,12,14,15 - hexahydro - 13H - 9,10 - endo-cyclopentanthracene-13,15-dione (5.50 g., 1 mol.) was dissolved in N,N-dimethylacetamide (40 ml.), 2-(2-chloropropenyl) - 1 - ethylnaphtho[1,2-d]thiazolium chloride (6.50 g., 1 mol.) was added. To the stirred solution, a solution of triethylamine (5.00 g., 1 mol.+25%) in N,N-dimethylacetamide (10 ml.) was added in one portion, and the mixture was stirred for five minutes. The crude product was isolated by filtration, washed with methanol, and dried. One recrystallization carried out by dissolving the crude product in m-cresol at 140 degrees C. and reprecipitating by the addition of methanol, gave 7.05 g. (67%) of crude dye. After one recrystallization of a portion of this crude dye (1.00 g.) from m-cresol and methanol, the yield of pure dye was 0.94 g. (63% corrected yield), M.P. 287.5–289.5 degrees C. dec.

By the use of an equivalent amount of 1-ethyl-2-(2-methylthiostyryl)naphtho[1,2-d]thiazolium p-toluenesulfonate, 1-ethyl-2-(2-methylthio-2-p-tolylvinyl)naphtho[1,2-d] thiazolium p-toluenesulfonate, 1-ethyl-2-(2-methylthio-1-butenyl)naphtho[1,2-d] thiazolium p-toluenesulfonate or 2-(2-anilinovinyl)-1-ethylnaphtho[1,2-d]thiazolium p-toluenesulfonate, respectively in place of 2-(2-chloropropenyl)-1-ethylnaphtho[1,2-d]thiazolium chloride in Example 3, 14-[(1-ethylnaphtho[1,2-d]thiazolin-2-ylidene)-1-phenylethylidene]-9,10,11,12,14,15-hexahydro-13H-9,10-endo-cyclopentanthracene-13,15-dione;

14-[(1-ethylnaphtho[1,2-d]thiazolin-2-ylidene)-1-p-tolylethylidene]-9,10,11,12,14,15-hexahydro-13H-9,10-endo-cyclopentanthracene-13,15-dione;

14-[(1-ethylnaphtho[1,2-d]thiazolin-2-ylidene)-1-ethylethylidene]-9,10,11,12,14,15-hexahydro-13H-9,10-endo-cyclopentanthracene-13,15-dione and 14-[(1-ethylnaphtho[1,2-d]thiazolin-2-ylidene)ethylidene]-9,10,11,12,14,15-hexahydro-13H-9,10-endocyclopentanthracene-13,15-dione, respectively, are obtained.

EXAMPLE 4

2 - [bis(1-ethylnaphtho[1,2-d]thiazolin-2-ylidenemethyl)methylene]cyclopentane-1,3-dione

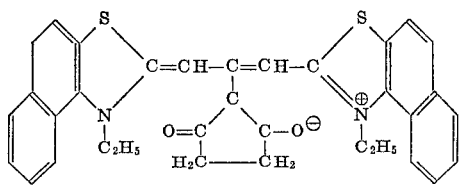

2 - [(1 - ethylnaphtho[1,2 - d]thiazolin-2-ylidene)-1-methylethylidene] - 1,3 - cyclopentanedione (1.05 g., 1 mol.) was dissolved in m-cresol (15 ml.). 1-ethyl-2-ethylthionaphtho[1,2-d]thiazolium ethosulfate (3.00 g., 1 mol.+200%) was added, and the mixture was heated to affect solution. Triethylamine (0.75 g., 1 mol.+200%) was added and the mixture was stirred and heated at 120–139 degrees C. for five minutes. Additional quantities of 1 - ethyl - 2 - ethylthionaphtho[1,2-d]thiazolium ethosulfate (2.00 g., 1 mol.+100%) and triethylamine (0.50 g., 1 mol.+100%) were added, and the mixture was stirred and heated at 120–134 degrees C. for five minutes. The mixture was cooled and diluted with ether (350 ml.). After chilling overnight, the ether was decanted and the residual oil was boiled with methanol (50 ml.) and then diluted with water (200 ml.). After chilling, the crude product was collected by filtration and dried. The crude product was boiled with methanol (75 ml.). The mixture was chilled and the crude product was again collected by filtration. This material was boiled with three portions of m-xylene (50 ml., 75 ml., and 75 ml., respectively), filtering the mixtures hot each time. The m-xylene insoluble material was boiled with N-N-dimethylacetamide (50 ml.) and almost pure dye was obtained in the N,N-dimethylacetamide insoluble fraction as well as from the N,N-dimethylacetamide filtrate after chilling, filtering and reprecipitating the dye with methanol. These fractions were combined, and after recrystallization from m-cresol and methanol, the yield of pure dye was 0.27 g. (19%), M.P. 290.0–292.0 degrees C., dec.

*Analysis.*—Calcd. for $C_{34}H_{28}N_2O_2S_2$ (percent): C, 72.8; H, 5.0. Found (percent): C, 72.6; H, 5.1.

EXAMPLE 5

2 - [bis(3 - ethyl-2-benzothiazolinylidenemethyl)methylene] - 2,3,3a,4,7,7a - hexahydro - 4,7 - methanoindene-1,3-dione

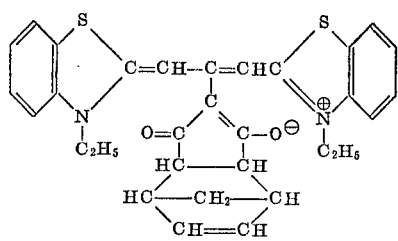

2,3,3a,4,7,7a-hexahydro-4,7-methanoindene - 1,3 - dione (0.60 g., 1 mol.+50%), 3,3'-diethyl-9-phenylthiothiacarbocyanine iodide (1.50 g., 1 mol.), triethylamine (0.25 g., 1 mol.) and N,N-dimethylacetamide (10 ml.) were mixed and heated rapidly, with stirring, to 130 degrees C. The mixture was stirred and heated at 130–140 degrees C. for five minutes. Triethylamine (10 drops) was added and the mixture was heated and stirred at 130–145 degrees C. for an additional twelve minutes. The mixture was cooled, diluted with methanol (50 ml.), and after chilling overnight, the crude dye was collected by filtration, washed with methanol, and dried. After one recrystallization of the crude dye from benzene followed by a second recrystallization from N,N-dimethylacetamide and methanol, the yield of pure dye was 0.15 g. (12%), M.P. 265 degrees C. dec.

*Analysis.*—Calcd. for $C_{31}H_{28}N_2O_2S_2$ (percent): C, 71.0; H, 5.4; S, 12.2. Found (percent): C, 71.0; H, 5.5; S, 12.2.

EXAMPLE 6

2-[bis(1-ethylnaphtho[1,2-d]thiazolin - 2 - ylidenemethyl)methylene]-2,3,3a,4,7,7a - hexahydro - 4,7 - methanoindene-1,3-dione

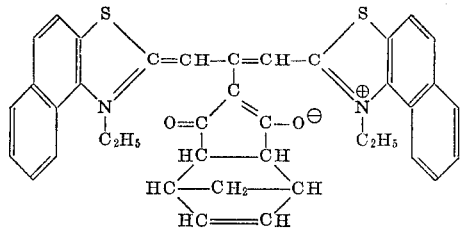

2,3,3a,4,7,7a-hexahydro - 4,7 - methanoindene - 1,3 - dione (0.55 g., 1 mol.+33%), triethylamine (0.25 g., 1 mol.), and N,N-dimethylacetamide (15 ml.) were mixed and heated to 110 degrees C. 3,3'-diethyl-9-phenylthio-4,5; 4',5'-dibenzothiacarbocyanine ethosulfate (1.75 g., 1 mol.) was added and the mixture was stirred and heated at 130–140 degrees C. for five minutes. A total of 1.20 g. (3 mol.) of 2,3,3a,4,7,7a-hexahydro-4,7-methanoindene-1,3-dione and 0.25 g. (1 mol.) of triethylamine was added over the next one-half to one hour while stirring the mixture at between room temperature and the reflux temperature. The mixture was cooled and diluted with methanol (75 ml.), and after chilling overnight, the crude product was isolated by filtration, washed with methanol and dried. After two recrystallizations from N,N-dimethylacetamide and methanol followed one recrystallization from m-xylene, the yield of pure dye was 0.17 g. (11%), M.P. 284.0–285.0 degrees C. dec.

*Analysis.*—Calcd. for $C_{39}H_{32}N_2O_2S_2$ (percent): C, 75.0; H, 5.2. Found (percent): C, 74.8; H, 5.4.

EXAMPLE 7

14-[bis(1-ethylnaphtho[1,2-d]thiazolin - 2-ylidenemethyl)methylene] - 9,10,11,12,14,15 - hexahydro - 13H - 9,10-endo-cyclopentanthracene-13,15-dione

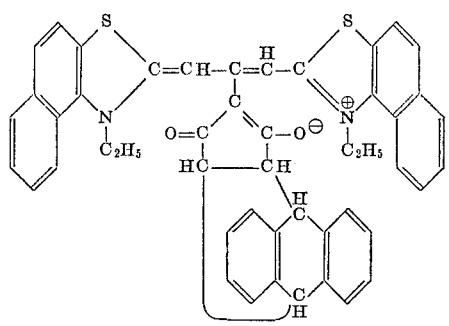

14-[(1 - ethylnaphtho[1,2 - d]thiazolin - 2 - ylidene)-1-methylethylidene]-9,10,11,12,14,15-hexahydro-13H - 9,10-endo-cyclopentanthracene-13,15-dione (1.75 g., 1 mol.) was dissolved in m-cresol (15 ml.). 1-ethyl-2-ethylthionaphtho[1,2 - d]thiazolium ethosulfate (4.00 g., 1 mol.+200%) was added and the mixture was warmed to affect solution. Triethylamine (1.00 g., 1 mol.+200%) was added, and the mixture was stirred and heated at 120–134 degrees C. for five minutes. Additional quantities of 1-ethyl-2-ethylthionaphtho[1,2-d]thiazolium ethosulfate (2.00 g., 1 mol.+50%) and triethylamine (0.50 g., 1 mol.+50%) were added, and the mixture was stirred and heated at 120–140 degrees C. for five minutes. The mixture was cooled and diluted with ether (350 ml.). After chilling overnight, the ether was decanted. The residual semicrystalline solid was boiled with methanol (ca. 50 ml.) and the resulting mixture was then diluted with water (200 ml.). After chilling, the water was decanted. The residual semicrystalline oil was boiled with methanol (75 ml.), and after chilling the mixture, the crude product was isolated by filtration, washed with methanol and dried. This crude product was boiled with three portions of methanol (50 to 75 ml. each portion), filtering hot each time. The methanol insoluble material was boiled with N,N-dimethylacetamide (50 ml.) and the mixture was filtered hot. The filtrate was diluted while still warm with methanol (150 ml.). The first crop of crystals from the warm solution was discarded. After chilling pure dye precipitated from this solution. The yield was 0.20 g. (8%), M.P. >310 degrees C.

Oxonol dye compounds having the formula:

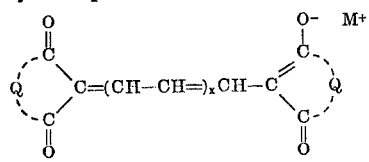

wherein Q has the meaning previously assigned to it, $x$ is 0, 1 or 2 and $M^+$ represents hydrogen; an alkali metal ion such as $Na^+$, $K^+$, $Li^+$, etc.; an ammonium ion such as ammonium, trimethylammonium, triethylammonium, tetramethylammonium, tetraethylammonium, benzyltrimethylammonium, a piperidinium ion (e.g., piperidinium, N-methylpiperidinium, N-ethylpiperidinium), a morpholinium ion (e.g., morpholinium) or a pyrrolidinium ion (e.g., pyrrolidinium), for example, or a cyclic immonium ion such as a pyridinium ion (e.g., pyridinium, α-methylpyridinium, β-methylpyridinium, γ-methylpyridinium, N-methylpyridinium, N-ethylpyridinium, etc.) or a quinolinium ion (e.g., quinolinium, N-methylquinolinium, N-ethylquinolinium, etc.), for example, can be prepared as described hereinafter. They are useful as bleachable light-absorbing dyes in filter layers for photographic elements.

EXAMPLE 8

Bis-(2-cyclopentane-1,3-dione)trimethineoxonol potassium salt

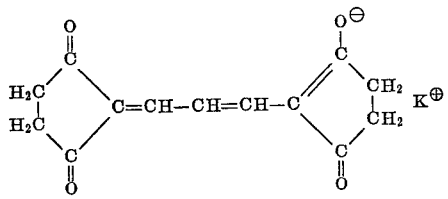

Cyclopentane-1,3-dione (1.95 g., 1 mol.), trimethoxy propene (1.35 g., 1 mol.), and ethanol (20 ml.) were mixed and heated until solution was complete. Triethylamine (2.00 g., 1 mol.) was added, and the mixture was heated under reflux for five minutes. The hot mixture was transferred to a beaker containing potassium acetate (2.0 g., 1 mol.) and the mixture was heated to boiling. After chilling overnight the crude dye was collected by filtration, washed with ethanol, and dried. This crude dye was combined with that obtained from a similar reaction carried out by stirring the warm mixture without external heating for one minute before addition of potassium acetate (3.0 g., 3 mol.) in a small amount of ethanol. After one recrystallization from methanol, the yield of pure dye was 0.32 g. (6%), M.P. >310 degrees C. This dye was primarily useful as a bleachable light-absorbing dye in filter layers for photographic elements.

By the use of an equivalent amount of 2,3,3a,4,7,7a-hexahydro-4,7-methanoindene - 1,3 - dione; 9,10,11,12,14,15 - hexahydro-13H-9,10-endo-cyclopentanthracene - 13,15-dione or 2,3,3a,4,7,7a-hexahydro-4,7-epoxyindene-1,3-dione, respectively, in place of cyclopentane-1,3-dione in Example 8, the corresponding bis[2,-(2,3,3a,4,7,7a-hexahydro-4,7-methanoindene-1,3-dione)] - trimethineoxonol, bis-[14-(9,10,11,12,14,15 - hexahydro - 13H - 9,10-endo-cyclopentanthracene - 13,15 - dione)]trimethineoxonol and bis[2-(2,3,3a,4,7,7a-hexahydro - 4,7 - epoxyindene - 1,3-dione)]trimethineoxonol dyes, respectively, are obtained.

By the use of an equivalent amount of diethoxymethyl acetate or half an equivalent of glutaconaldehyde dianil hydrochloride in place of trimethoxypropene in Example 8 the lower and higher vinylogs of bis-(2-cyclopentane-1,3-dione)-trimethineoxonol, i.e., bis-(2-cyclopentane-1,3-dione)methineoxonol and bis-(2-cyclopentane-1,3-dione) pentamethineoxonol, respectively can be prepared.

In like manner 2,3,3a,4,7,7a-hexahydro-4,7-methanoindene-1,3-dione can be reacted with diacetoxymethyl acetate or glutaconaldehyde dianil hydrochloride in accordance with the procedure of Example 8 to obtain bis-[2-(2,3,3a,4,7,7a - hexahydro - 4,7 - methanoindene - 1,3-dione)]methineoxonol and bis-[2-(2,3,3a,4,7,7a-hexahydro - 4,7 - methanoindene-1,3-dione)]pentamethineoxonol, respectively.

Similarly 9,10,11,12,14,15 - hexahydro-13H-9,10-endo-cyclopentanthracene-13,15-dione can be reacted with diacetoxymethyl acetate or glutaconaldehyde dianil hydrochloride in accordance with the procedure of Example 8 to obtain bis[14 - (9,10,11,12,14,15-hexahydro-13H-9,10-endo - cyclopentanthracene-13,15-dione)] - methineoxonol and bis[14 - (9,10,11,12,14,15-hexahydro-13H-9,10-endo-cyclopentanthracene - 13,15 - dione)]pentamethineoxonol, respectively.

Further 2,3,3a,4,7,7a-hexahydro - 4,7 - epoxyindene-1,3-dione can be reacted with diacetoxymethyl acetate or glutaconaldehyde dianil hydrochloride in accordance with the procedure of Example 8 to obtain bis-[2-(2,3,3a,4,7, 7a - hexahydro-4,7-epoxyindene - 1,3 - dione)]methineoxonol and bis-[2-(2,3,3a,4,7,7a-hexahydro - 4,7 - epoxyindene-1,3-dione)]pentamethineoxonol, respectively.

EXAMPLE 9

2-[(1-ethylnaphtho[1,2-d]thiazolin - 2 - ylidene) - 1 - methylethylidene] - 2,3,3a,4,7,7a - hexahydro - 4,7 - epoxyindene-1,3-dione

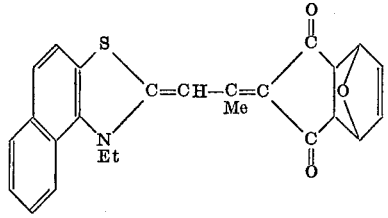

2,3,3a,4,7,7a - hexahydro - 4,7 - epoxyindene-1,3-dione (3.30 g., 1 mol.) was mixed with N,N-dimethylacetamide (25 ml.). 2-(2-chloropropenyl) - 1 - ethylnaphtho[1,2-d] thiazolium chloride (6.50 g., 1 mol.) was added. To this stirred mixture, a solution of triethylamine (4.00 g., 1 mol.) in N,N-dimethylacetamide (10 ml.) was added in one portion and stirring was continued for thirty minutes. The mixture was chilled and the crude product was isolated by filtration, washed with methanol and dried. One recrystallization, carried out by dissolving the crude product in m-cresol at 145° C., and reprecipitating by the addition of methanol, gave 4.60 g. (55%) of crude dye. After one recrystallization of a portion of this crude dye (1.00 g.) from m-cresol and methanol, the yield of pure dye was 0.67 g. (37% corrected yield), M.P. 173.5–176.5° C., dec.

Analysis.—Calcd. for $C_{25}H_{21}NO_3S$: (percent: C, 72.6; H, 5.1. Found (percent): C, 72.1, H, 5.0.

EXAMPLE 10

2-[bis(3-ethyl-2-benzothiazolinylidenemethyl) methylene]-1,3-cyclopentanedione

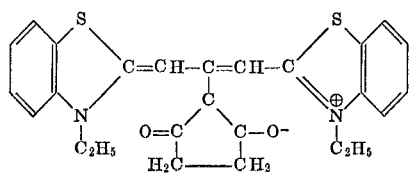

2[(3-ethyl-2-benzothiazolinylidene) - 1 - methylethylidene[-1,3-cyclopentanedione (1.00 g., 0.0083 mol.), 3-ethyl-2-phenylthiobenzothiazolium iodide (6.00 g., 0.015 mol.), m-cresol (15 ml.) and triethylamine (1.5 g., 0.015 mol.) were stirred and heated in a flask at 120–136° C. for 12 minutes. The gummy precipitate, which resulted from precipitation with 300 ml. ether, was dried in an oven and then dissolved in 30 ml. methanol and precipitated by a mixture of 200 ml. water and 100 ml. ether. The solid which separated was filtered off, dried, boiled with 30 ml. methanol and the resulting solution chilled. The crude dye was filtered and dried. Crude yield, 1.25 g. (82%). The dye was purified by recrystallization from methanol until thin layer chromatography showed no dye impurities.

EXAMPLE 11

2-[(1-ethylnaphtho[1,2-d]thiazolin-2-ylidene)-1-methylethylidene]-1,3-cyclopentanedione

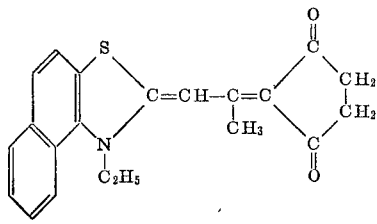

1,3-cyclopentanedione (1.5 g., 0.015 mol.) was dissolved in dimethylacetamide (20 ml.); then 2-(2-chloropropenyl) - 1 - ethylnaphtho[1,2-d]thiazolinium chloride (4.85 g., 0.015 mol.), and a solution of triethylamine (3.50 g., 0.035 mol.) in dimethylacetamide (10 ml.) was added with stirring. The precipitate which separated after a short while was filtered, washed with methanol and dried. The crude dye was purified by dissolving it in a small amount of m-cresol and precipitating it with methanol. The purified dye, isolated in 66% yield, melted at 279–280° C. dec.

The dyes listed in Table 1 below were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsions at the concentrations indicated. The emulsions were then coated at a coverage of 432 mg. silver/ft.$^2$ on a cellulose acetate film support. A sample of each coating was exposed on an Eastman IB Sensitometer and to a wedge spectrograph, processed for three minutes in a developer of the following composition:

Developer

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |

Water to make 1.0 liter.

and then fixed, washed and dried. The sensitizing values obtained are shown in the following Table 1.

TABLE 1

| Dye of Example No. | Dye concentration (g./mole −silver) | Emulsion type | Sensitizing Range (mu) to | Sensitizing Maximum (mu) |
|---|---|---|---|---|
| 2 | 0.08 | Silver bromoiodide | 540 | 510 |
| 4 | 0.08 | do | 680 | 630 |
| 5 | 0.14 | do | 630 | 585 |
| 6 | 0.14 | do | 640 | 530 |
| 7 | 0.08 | do | 690 | 600 |
| 9 | 0.08 | do | 530 | 500 |
| 10 | 0.08 | do | 650 | 630 |

By substituting other intermediates defined by Formulas I and VI hereinbefore, wherein Z and $Z_1$ each represents the non-metallic atoms necessary to complete, for example, a thiazole, oxazole, benzoxazole, naphthoxazole, selenazole, benzoselenazole, naphthoselenazole or a thiazoline nucleus, in the procedures of the preceding Examples 4 to 7, corresponding holopolar cyanine dyes having generally similar sensitizing properties for photographic silver halide emulsions can be readily obtained.

For the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are sensitized with our dyes include any of those prepared with hydrophilic colloids that are known to be satisfactory for dispersing light-sensitive silver halides, for example, emulsions prepared with hydrophilic colloids, such as, natural materials, e.g., gelatin albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of our new dyes in the emulsion can vary widely, i.e., from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The emulsions are coated to advantage on any of the support materials commonly used for photographic elements, for example, cellulose acetate, cellulose acetate-propionate, polystyrene, polyethylene terephthalate, etc.

To prepare a gelatino-silver halide emulsion sensitized with one of our new dyes, the following procedure is satisfactory: A quantity of the dye is dissolved in a suitable solvent, and a volume of this solution containing from 5 to 100 mgs. of dye is slowly added with intimate mixing to about 1,000 cc. of a gelatino-silver halide emulsion. With most of our dyes, 10 to 20 mgs. of dye per liter of emulsion suffices to produce the maximum sensitizing effect with the ordinary gelatino-silver halides including silver chloride, bromide, bromoiodide, chlorobromide, chlorobromoiodide, etc. With fine-grain emulsions which include most of the ordinary employed gelatino-silver chloride emulsions, somewhat larger concentrations of dye may be necessary to secure the optimum sensitization. While the preceding has dealt with emulsions comprising gelatin, it will be understood that these remarks apply generally to any emulsions in which a part or all of the gelatin is substituted by another suitable hydrophilic colloid such as those previously mentioned.

The above statements are only illustrative and are not to be understood as limiting our invention in any sense, as it will be apparent that our dyes can be incorporated by other methods in many of the emulsions customarily used in the art. For instance, the dyes can be incorporated by bathing a plate of film bearing an emulsion, in a solution of the dye.

Photographic silver halide emulsions, such as those listed above, containing the sensitizing dyes of the invention can also contain such addenda as chemical sensitizers, e.g., sulfur sensitizers (e.g., allyl thiocarbamide, thiourea, allylisothiocyanate, cystine, etc.), various gold compounds (e.g., potassium chloraurate, auric trichloride, etc.) (see Baldsiefen U.S. Pat. 2,540,085, issued Feb. 6, 1951; Damshroder U.S. Pat. 2,597,856, issued May 27, 1952, and Yutzy et al., U.S. Pat. 2,597,915, issued May 27, 1952), various palladium compounds, such as palladium chloride (Baldsiefen U.S. Pat. 2,540,086, issued Feb. 6, 1951), potassium chloropalladate (Stauffer et al., U.S. Pat. 2,598,079, issued May 27, 1952), etc., or mixtures of such sensitizers; antifoggants, such as ammonium chloroplatinate (Trivelli et al., U.S. Pat. 2,566,245, issued Aug. 28, 1951), ammonium chloroplatinite (Trivelli et al., U.S. Pat. 2,566,263, issued Aug. 28, 1951), benzotriazole, nitrobenzimidazole, 5 - nitroindazole, benzidine, mercaptans, etc. (see Mees—"The Theory of the Photographic Process," MacMillan Pub., 1942, page 460), or mixtures thereof; hardeners, such as formaldehyde (Miller, U.S. Pat. 1,763,533, issued June 10, 1930), chrome alum (1,763,533), glyoxal (Brunken U.S. Pat. 1,870,354, issued Aug. 9, 1932), dibromacrolein (Block et al., British Pat. 406,750, accepted Mar. 8, 1934), etc.; color couplers, such as those described in Salminen et al., U.S. Pat. 2,423,730, issued July 7, 1947, Spence and Carroll, U.S. Pat. 2,640,776, issued June 2, 1953, etc.; or mixtures of such addenda. Dispersing agents for color couplers, such as those set forth in Jelley et al., U.S. Pat. 2,322,027, issued June 15, 1943, and Mannes et al., U.S. Pat. 2,304,940, issued Dec. 15, 1942, can also be employed in the above-described emulsions.

We claim:
1. A photographic silver halide emulsion containing a dye having one of the following formulas:

I

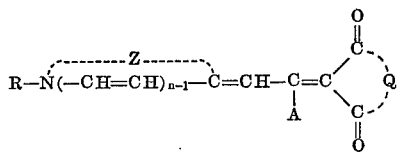

and

II

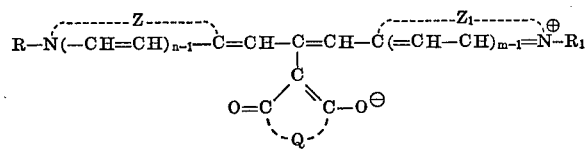

wherein $m$ and $n$ each represents a positive integer of from 1 to 2; A represents a member selected from the group consisting of a hydrogen atom, an alkyl group having 1 to 4 carbon atoms and a monocyclic aryl nucleus containing 6 nuclear carbon atoms; R and $R_1$ each represents a member selected from the group consisting of an alkyl group, a hydroxyalkyl group having 2 to 4 carbon atoms, an alkoxyalkyl group having 3 to 8 carbon atoms, a carboxyalkyl group having 1 to 5 carbon atoms, a sulfoalkyl group having 2 to 4 carbon atoms, a sulfatoalkyl group having 2 to 4 carbon atoms, an alkanoyloxyalkyl group having 4 to 8 carbon atoms, an alkoxycarbonylalkyl group having 4 to 9 carbon atoms, an alkenyl group having 3 to 5 carbon atoms, an aralkyl group and a monocyclic aryl nucleus containing 6 nuclear carbon atoms; Q represents the non-metallic atoms necessary to complete a nucleus produced by the Diels-Alder reaction of the dienophile cyclopentene-1,3-dione with cyclopentadiene, anthracene or furan; and, Z and $Z_1$ each represents the non-metallic atoms necessary to complete a heterocyclic nucleus selected from the group consisting of a thiazole nucleus, a benzothiazole nucleus, a naphthothiazole nucleus, a thianaphtheno - 7',6',4,5 - thiazole nucleus, an oxazole nucleus, a benzoxazole nucleus, a naphthoxazole nucleus, a selenazole nucleus, a benzoselenazole nucleus, a naphthoselenazole nucleus, and a thiazoline nucleus.

2. A photographic silver halide emulsion in accordance with claim 1 wherein said dye has general Formula I.

3. A photographic silver halide emulsion in accordance with claim 1 wherein said dye has general Formula II.

4. A photographic silver halide emulsion as defined in claim 2 wherein said A represents methyl.

5. A photographic silver halide emulsion as defined in claim 3 wherein the dye is a symmetrical dye.

6. A light sensitive photographic silver halide emulsion containing, as spectral sensitizer, 2-[(ethylnaphtho[1,2 - d] - thiazolin - 2 - ylidene) - 1-methylethylidene]-2,3,3a,4,7,7a-hexahydro-4,7-methanoindene-1,3-dione.

7. A light sensitive photographic silver halide emulsion containing, as spectral sensitizer, 14-[(1-ethylnaphtho[1,2-d]thoiazolin - 2 - ylidene) - 1 - methylethylidene]-9,10,11,12,14,15 - hexahydro - 13H - 9,10 - endo - cyclopentanthracene-13,15-dione.

8. A light sensitive photographic silver halide emulsion containing, as spectral sensitizer, 2-[bis(3-ethyl-2-benzothiazolinylidenemethyl)methylene] - 2,3,3a,4,7,7a - hexahydro-4,7-methanolindene-1,3-dione.

9. A light sensitive photographic silver halide emulsion containing, as spectral sensitizer, 2-[bis(1-ethylnaphtho[1,2-d]thiazolin - 2 - ylidenemethyl)methylene] - 2,3,3a,4,7,7a-hexahydra-4,7-methanoindene-1,3-dione.

10. A light sensitive photographic silver halide emulsion containing, as spectral sensitizer, 14-[bis(1-ethylnaphtho[1,2-d]thiazolin - 2 - ylidenemethyl)methylene]-9,10,11,12,14,15 - hexahydro - 13H - 9,10 - endo - cyclopentanthracene-13,15-dione.

11. A light sensitive photographic silver halide emulsion containing, as spectral sensitizer, a dye having the following formula:

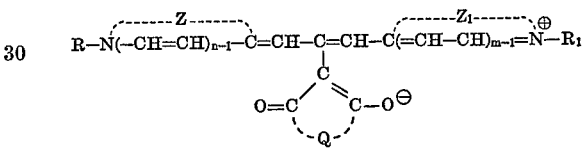

wherein $m$ and $n$ each represents a positive integer of from 1 to 2; R and $R_1$ each represents a member selected from the group consisting of an alkyl group, a hydroxyalkyl group having 2 to 4 carbon atoms, an alkoxyalkyl group having 3 to 8 carbon atoms, a carboxyalkyl group having 1 to 5 carbon atoms, a sulfoalkyl group having 2 to 4 carbon atoms, a sulfatoalkyl group having 2 to 4 carbon atoms, an alkanoyloxyalkyl group having 4 to 8 carbon atoms, an alkoxycarbonylalkyl group having 4 to 9 carbon atoms, an alkenyl group having 3 to 5 carbon atoms, an aralkyl group and a monocyclic aryl nucleus containing 6 nuclear carbon atoms; Q represents the non-metallic atoms necessary to complete a nucleus selected from the group consisting of a 2,3,3a,4,7,7a-hexahydro-4,7 - methanoindene - 1,3 - dione nucleus; a 9,10,11,12, 14,15 - hexahydro - 13H - 9,10 - endo - cyclopentanthracene - 13,15 - dione nucleus; and a 2,3,3a(4,7,7a - hexahydro - 4,7 - epoxyindene - 1,3 - dione nucueus; and, Z and $Z_1$ each represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a thiazoline nucleus.

References Cited
UNITED STATES PATENTS

| | | | |
|---|---|---|---|
| 2,548,571 | 4/1951 | Van Lare et al. | 96—140 |
| 2,739,964 | 3/1956 | Brooker et al. | 96—127 |
| 3,140,182 | 7/1964 | Haseltine et al. | 96—142 |
| 3,140,951 | 7/1964 | Haseltine et al. | 96—101 |
| 3,379,533 | 4/1968 | Jenkins et al. | 96—142 |
| 3,440,052 | 4/1969 | Haseltine | 96—127 |
| 3,440,053 | 4/1969 | Holtzclaw et al. | 96—140 |

J. TRAVIS BROWN, Primary Examiner

U.S. Cl. X.R.

96—84, 140, 141, 142; 260—240.1, 240.2, 240.4